United States Patent
Uchida

(10) Patent No.: US 11,584,165 B2
(45) Date of Patent: Feb. 21, 2023

(54) PNEUMATIC TIRE

(71) Applicant: The Yokohama Rubber Co., LTD., Tokyo (JP)

(72) Inventor: Yuta Uchida, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 217 days.

(21) Appl. No.: 16/961,630

(22) PCT Filed: Dec. 12, 2018

(86) PCT No.: PCT/JP2018/045702
§ 371 (c)(1),
(2) Date: Jul. 10, 2020

(87) PCT Pub. No.: WO2019/138768
PCT Pub. Date: Jul. 18, 2019

(65) Prior Publication Data
US 2020/0338931 A1    Oct. 29, 2020

(30) Foreign Application Priority Data
Jan. 11, 2018    (JP) ............................. JP2018-002745

(51) Int. Cl.
*B60C 11/12*    (2006.01)

(52) U.S. Cl.
CPC ...... *B60C 11/1204* (2013.01); *B60C 11/1218* (2013.01); *B60C 11/1222* (2013.01)

(58) Field of Classification Search
CPC ......................... B60C 11/1218; B60C 11/1222
See application file for complete search history.

(56) References Cited

U.S. PATENT DOCUMENTS

| | | | |
|---|---|---|---|
| 4,566,514 A | * | 1/1986 | Mauk .................. B60C 11/12 152/DIG. 3 |
| 2002/0053383 A1 | | 5/2002 | Kleinhoff et al. |

(Continued)

FOREIGN PATENT DOCUMENTS

| | | |
|---|---|---|
| EP | 2 465 708 | 6/2012 |
| JP | H11-048721 | 2/1999 |

(Continued)

OTHER PUBLICATIONS

Machine translation for Japan 11-123910 (Year: 2022).*
International Search Report for International Application No. PCT/JP2018/045702 dated Jan. 15, 2019, 4 pages Japan.

*Primary Examiner* — Steven D Maki
(74) *Attorney, Agent, or Firm* — Thorpe North & Western

(57) ABSTRACT

In a tread portion of a pneumatic tire, a first sipe wall surface of a sipe includes at least two first peak portions and at least one first valley portion at each position of the sipe extension direction, which are bent in a wave-like shape to form surface recesses and protrusions along a sipe depth direction. The first valley portion is sandwiched between the two first peak portions in the sipe depth direction, and extends from one end of the sipe in the extension direction to the other end of the sipe in the extension direction. A recess depth of the first valley portion with respect to the two first peak portions gradually reduces. A position of at least one of the two first peak portions in the sipe depth direction and a position of the first valley portion in the sipe depth direction become gradually closer.

18 Claims, 5 Drawing Sheets

(56) References Cited

U.S. PATENT DOCUMENTS

2002/0170643 A1* 11/2002 Kuze ................ B60C 11/12
                                                                                          152/209.5
2010/0307651 A1    12/2010  Castellini
2014/0299245 A1    10/2014  Kaji

FOREIGN PATENT DOCUMENTS

| JP | 11-123910 A * | 5/1999 |
|---|---|---|
| JP | H11-310012 | 11/1999 |
| JP | 2000-177329 | 6/2000 |
| JP | 2006-044570 | 2/2006 |
| JP | 2007-186053 | 7/2007 |
| JP | 2011-105131 | 6/2011 |
| JP | 2011-105135 | 6/2011 |
| JP | 2013-103579 | 5/2013 |
| WO | WO 2009/077807 | 6/2009 |
| WO | WO 2013-065304 | 5/2013 |

* cited by examiner

PNEUMATIC TIRE

TECHNICAL FIELD

The present technology relates to a pneumatic tire provided with sipes in a tread pattern.

BACKGROUND ART

In general, in a pneumatic tire (hereinafter, simply referred to as a tire), a plurality of sipes extending in a tire lateral direction are provided in blocks of a tread portion for the purpose of improving braking performance on wet road surfaces and icy road surfaces with an edge effect and a drainage effect exerted by the sipes. However, when the sipes are provided, rigidity of the blocks is degraded. Thus, in a new product tire, increased wear amount due to flexed blocks and degradation of steering stability on dry road surfaces are caused. Further, there has been known a technique of enhancing rigidity of the blocks by preventing the blocks from being flexed with sipes that are formed in a wave shape along a sipe depth direction. When wear progresses during traveling, a tread gauge is thick, and rigidity of the blocks is higher due to degradation of tread rubber. Thus, braking performance on wet road surfaces and icy road surfaces is largely degraded. Further, regarding the sipes in a wave-like shape, a sipe cutting edge provided to a mold for vulcanization molding is difficult to come off, and hence the blocks are more likely to be damaged when the sipe cutting edge comes off from the tire. Causing the cutting sipe to come off from the tire as described above is referred to as demolding of the tire.

For example, there has been known a pneumatic tire capable of suppressing degradation of rigidity of blocks or ribs in a new product tire with sipes, preventing rigidity of the blocks and the ribs from being excessively high along with wear progress, and effectively making improvement in degradation of demolding of the tire at the time of vulcanization molding (Japan Unexamined Patent Publication No. 2011-105131).

In the pneumatic tire, sipes are provided to the blocks and/or the ribs of a tread portion, and bend portions forming recesses/protrusions in a sipe width direction are provided along a sipe depth direction at least both ends of the sipe in a sipe length direction. The sipe has such a shape that the size of the recesses/protrusions of the bent portions are gradually reduced toward the center in the sipe length direction and that the bent portion at one end and the bent portion at the other end in the sipe length direction form the recesses/protrusions in directions opposite to each other in the sipe width direction.

In the sipe, the width of the recesses/protrusions reduces gradually as approaching the other end from the one end in the sipe length direction, and the width of the recesses/protrusions is zero at the center between the one end and the other end in the sipe length direction. In the pneumatic tire, when one sipe wall surface is flexed, the recesses/protrusions of the other sipe wall surface can support the one sipe wall surface, and hence rigidity is secured. Meanwhile, the size of the recesses/protrusions of the bent portions of the sipe reduces gradually toward the center in the sipe length direction, and hence the sipe cutting edge of the mold is difficult to come off at the time of vulcanization molding.

However, demolding of the pneumatic tire at the time of completion of vulcanization molding is not yet sufficient. When the width of the recesses/protrusions of the bent portion is reduced for the purpose of improving demolding of the tire, a flexed block and a rib, that is, the one flexed sipe wall surface cannot be supported sufficiently by the recesses/protrusions of the other sipe wall surface. As a result, rigidity is not improved.

SUMMARY

The present technology provides a pneumatic tire including sipes that have surface recesses/protrusions of sipe wall surfaces different from those in the related art, and are capable of suppressing degradation of rigidity of blocks and ribs with the sipes due to the sipe wall surfaces supporting each other with the recesses/protrusions of the sipe wall surfaces while improving demolding of the tire at the time of tire manufacturing.

A first aspect of the present technology is a pneumatic tire provided with a sipe in a tread portion. The pneumatic tire includes, in the tread portion, a first sipe wall surface of a pair of sipe wall surfaces that face a space of the sipe, the first sipe wall surface including a first wave-like portion at each position in an extension direction of the sipe in which the sipe extends on a tread surface, the first wave-like portion being bent in a wave-like shape to form surface recesses/protrusions along a sipe depth direction and including at least two first peak portions and at least one first valley portion, and a second sipe wall surface of the pair of sipe wall surfaces that includes a second wave-like portion at each position in the extension direction of the sipe, the second wave-like portion being bent in a wave-like shape to form surface recesses/protrusions along the sipe depth direction and including at least two valley portions that are provided facing the at least two first peak portions and at least one second peak portion that is provided facing the at least one first valley portion.

The first valley portion is sandwiched between the two first peak portions in the sipe depth direction and extends from one end side of the sipe in the extension direction to an other end side of the sipe in the extension direction, a recess depth of the first valley portion with respect to the two first peak portions gradually reduces as progressing from the one end side to the other end side, and a position of at least one of the two first peak portions in the sipe depth direction and a position of the first valley portion in the sipe depth direction are gradually closer to each other as progressing from the one end side to the other end side.

It is preferred that, a projection level of a top portion of the first peak portion with respect to a sipe reference plane of the sipe be constant at any position in the extension direction, the sipe reference plane being a plane formed so that an average of a values is zero, when the value is defined as variable dimension of the surface recesses/protrusions of the first peak portions and the first valley portion along the sipe depth direction with respect to the sipe reference plane with positive or negative value, at each position in the extension direction, that arrangements of the first peak portions along the sipe depth direction vary along the extension direction, that the first peak portions include a peak portion α and a peak portion β, and that a gap between a top portion of the peak portion α and a top portion of the peak portion β in the sipe depth direction gradually reduce as progressing from the one end side of the sipe in the extension direction to the other end side of the sipe in the extension direction.

It is preferred that the first peak portions include a plurality of ridge lines, each ridge line being a top portion of one of the first peak portions continuously extending in the extension direction, that the first valley portion include a valley bottom line, the valley bottom line being a bottom portion of the first valley portion continuously extending in the extension direction, and that at least one of the plurality of ridge lines and the valley bottom line has a position varying in the sipe depth direction while progressing in the extension direction.

It is preferred that a ridge line A being one of the plurality of ridge lines and a ridge line B being another one of the plurality of ridge lines of the first peak portion become closer as progressing to one of both end sides of the sipe in the extension direction.

It is preferred that the ridge line A and the ridge line B be joined to each other, that a valley bottom line C being the valley bottom line be provided between the ridge line A and the ridge line B in the sipe depth direction, that the valley bottom line C extend to a first joining position of the ridge line A and the ridge line B, and that the recess depth of the valley bottom line C reduce gradually as approaching the first joining position, and the recess depth of the valley bottom line C become zero at the first joining position.

It is preferred that, a ridge line D of the plurality of ridge lines in the first peak portions and different from the ridge line B, be provided parallel to the ridge line A at a position deeper than the ridge line A in the sipe depth direction, that the ridge line D join the ridge line B, and that a second joining position of the ridge line D and the ridge line B be different from the first joining position.

It is preferred that the at least one first valley portion be a plurality of first valley portions, that a valley bottom line E of the plurality of first valley portions be provided parallel to the valley bottom line C at a position deeper than the valley bottom line C in the sipe depth direction, and that the valley bottom line E join the ridge line B and the ridge line D at the second joining position.

It is preferred that a position of a deepest valley portion of the valley bottom line E with a maximum recess depth in the extension direction and a position of the first joining position in the extension direction be identical to each other.

It is preferred that a direction in which the recess depth of the valley bottom line C reduces and a direction in which the recess depth of the valley bottom line E reduces be opposite to each other.

It is preferred that a position of a deepest valley portion of the valley bottom line C with a maximum recess depth in the extension direction and a position of the second joining position in the extension direction be identical to each other.

The valley bottom line C is preferably parallel to the tread surface.

According to the pneumatic tire described above, degradation of rigidity of the blocks and the ribs with the sipes can be suppressed due to the sipe wall surfaces supporting each other with the recesses/protrusions of the sipe wall surfaces while improving demolding of the tire at the time of tire manufacturing.

DETAILED DESCRIPTION

Figure 1:
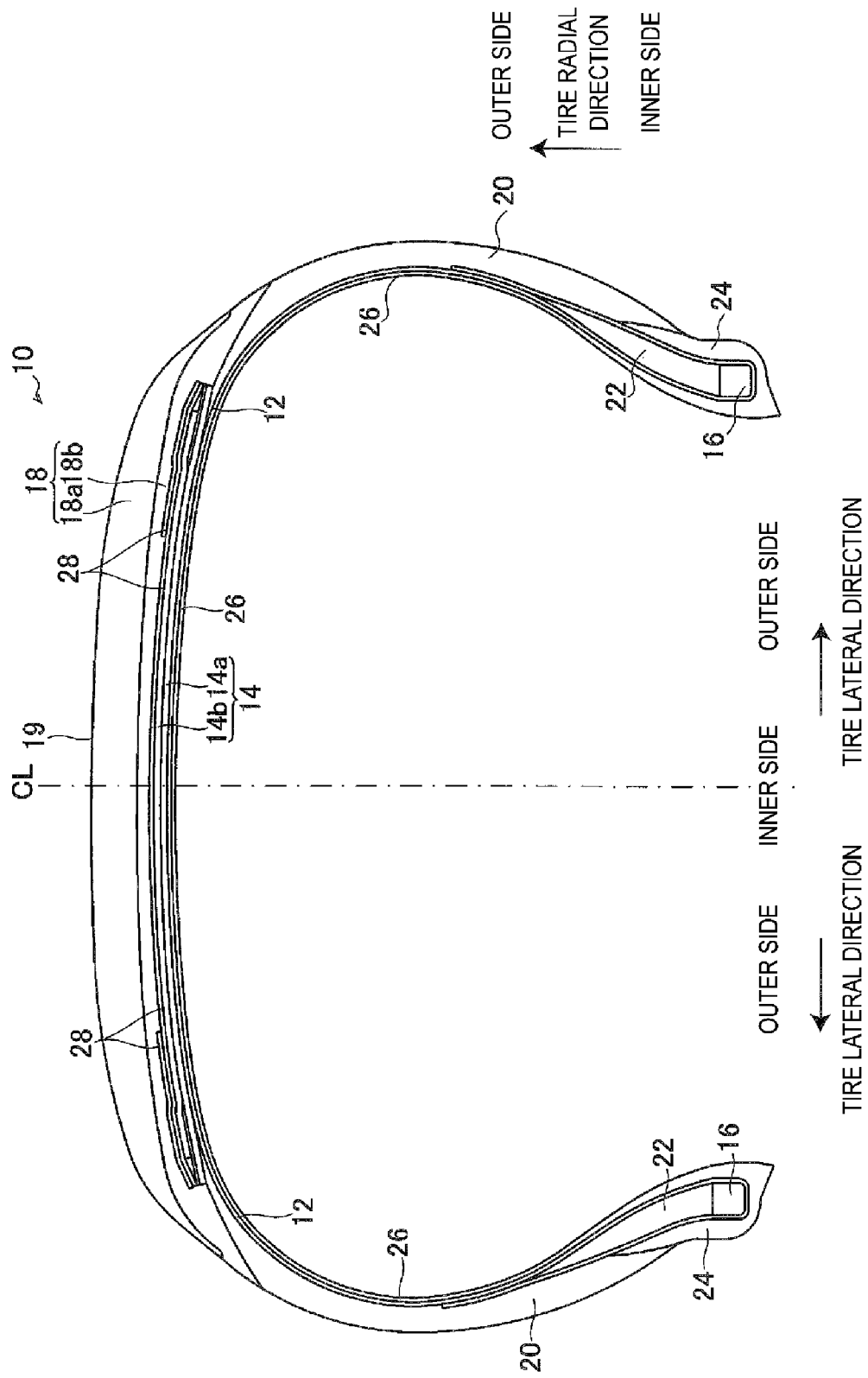
FIG. 1 is a tire cross-sectional view illustrating a cross-section of a pneumatic tire according to an embodiment.

Now, a pneumatic tire according to an embodiment is described. FIG. 1 is a tire cross-sectional view illustrating a cross-section of a pneumatic tire (hereinafter referred to as "tire") 10 according to an embodiment.

The tire 10 is, for example, a tire for a passenger vehicle. A tire for a passenger vehicle refers to a tire specified in Chapter A of the JATMA Year Book 2010 (standards of The Japan Automobile Tyre Manufacturers Association, Inc.). The tire can also be a small truck tire specified in Chapter B or a truck tire or bus tire specified in Chapter C.

A tire circumferential direction described hereafter refers to the direction in which a tread surface 19 rotates when the tire 10 rotates about the tire rotation axis. A tire radial direction refers to the radiation direction that extends orthogonal to the tire rotation axis. An outer side in the tire radial direction refers to a side away from the tire rotation axis in the tire radial direction. A tire lateral direction refers to the direction parallel with the tire rotation axis direction. Outer sides in the tire lateral direction refer to the sides away from a tire equator line CL of the tire 10.

Further, the pneumatic tire according to the present embodiment includes sipes in a tread portion. A first sipe wall surface of a pair of sipe wall surfaces of the tread portion, which face a space (gap) of the sipe, includes a wave-like portion at each position in a sipe extension direction in which the sipe extends in the tread surface. The wave-like portion is bent in a wave-like shape to form surface recesses/protrusions along a sipe depth direction, and has at least two peak portions and at least one valley portion. A second sipe wall surface of the pair of sipe wall surfaces includes a wave-like portion at each position in the sipe extension direction, which is bent in a wave-like shape to form surface recesses/protrusions along the sipe depth direction, and has at least two second valley portion provided to face at least two first peak portions and at least one second peak portion provided to face at least one first valley portion. The wave-like portions of the first sipe wall surface and the second sipe wall surface are preferably provided to positions falling within a range of from 60% to 100% of the entire sipe length along the sipe extension direction.

In this case, when the first peak portion and the first valley portion are viewed along the sipe depth direction, the shapes of the first peak portion and the first valley portion are set so that a recess depth of the first valley with respect to the first peak portions in the first sipe wall surface varies in accordance with the position in the sipe extension direction. Moreover, the first valley portion is sandwiched between the two first peak portions in the sipe depth direction, and extends from one end side in the sipe extension direction to the other end side in the sipe extension direction. The recess depth of the first valley portion with respect to the two first peak portions reduces gradually as approaching the other end side from the one end side. At least one position of the two first peak portions in the sipe depth direction and a position of the first valley portion in the sipe depth direction become gradually closer to each other from the one end side to the other end side. As described above, at each position of the wave-like portions of the sipe wall surfaces in the sipe extension direction, the recess depth of the first valley portion varies. At any position in the sipe extension direction, the peak portion and the valley portion are present.

Moreover, the recess depth of the first valley portion reduces gradually, and at least one position of the first peak portions in the sipe depth direction and the position of the first valley portion in the sipe depth direction become gradually closer to each other. Meanwhile, in the second sipe wall surface, at the positions facing to the first peak portions and the first valley portion, the second valley portions and the second peak portion are provided. Thus, the sipe wall surfaces can support each other with the recesses/protrusions of the sipe wall surfaces. As a result, degradation of rigidity of blocks and ribs, which may be caused by providing the blocks and the ribs, can be suppressed. Moreover, the first valley portion extends from the deepest valley portion to the end side in the sipe extension direction, and the recess depth is reduced. Thus, demolding can be improved. That is, degradation of rigidity of the blocks and the ribs of the tread portion with the sipes can be suppressed due to the sipe wall surfaces supporting each other with the recesses/protrusions of the sipe wall surfaces while improving demolding of the tire.

Now, the pneumatic tire provided with the sipes described above is described.

Tire Structure

The tire 10 mainly includes a carcass ply layer 12, a belt layer 14, and a bead core 16 as framework members or layers of framework members, and a tread rubber member 18, side rubber members 20, bead filler rubber members 22, rim cushion rubber members 24, and an innerliner rubber member 26 around the framework members.

The carcass ply 12 includes a carcass ply member that is formed from organic fibers covered with rubber and that is wound between the pair of bead cores 16 of an annular shape so as to be formed into a toroidal shape. In the tire 10 illustrated in FIG. 1, the carcass ply layer 12 is made of a single carcass ply member, but may also be made of two carcass ply members. The belt layer 14 is provided outward of the carcass ply layer 12 in the tire radial direction, and is constituted of two belt members 14a, 14b. The belt layer 14 is a member that is formed of rubber-covered steel cords disposed inclined at a predetermined angle of, for example, from 20 degrees to 30 degrees with respect to the tire circumferential direction. A width of a belt member 14a being a lower layer is larger than that of a belt member 14b being an upper layer. The steel cords of the two belt members 14a, 14b are inclined in opposite directions. As such, the belt members 14a, 14b are crossing layers serving to suppress expansion of the carcass ply layer 12 due to the pressure of the air in the tire.

The tread rubber member 18 is disposed outward of the belt layer 14 in the tire radial direction. Both end portions of the tread rubber member 18 connect to the side rubber members 20 to form the sidewall portions. The tread rubber member 18 is made of two layers of rubber members, namely an upper layer tread rubber member 18a provided on the outer side in the tire radial direction and a lower layer tread rubber member 18b provided on the inner side in the tire radial direction. The rim cushion rubber members 24 are provided at the inner ends of the side rubber members 20 in the tire radial direction and come into contact with a rim on which the tire 10 is mounted. The bead filler rubber members 22 are provided on the outer side of the bead cores 16 in the tire radial direction so as to be interposed between a portion of the carcass ply layer 12 before being wound around the bead cores 16 and a portion of the carcass ply layer 12 after being wound around the bead cores 16. The innerliner rubber member 26 is provided on the inner surface of the tire 10 facing a tire cavity region that is filled with air and is surrounded by the tire 10 and the rim.

In addition, the tire 10 includes a belt cover layer 28 formed from organic fiber covered with rubber that covers the belt layer 14 from the outer side in the tire radial direction of the belt layer 14.

The tire 10 has a tire structure as described above, but the tire structure is not limited to the tire structure illustrated in FIG. 1. In FIG. 1, a groove cross-sectional view of a tread pattern 50 formed on the tread rubber member 18, which is described later, is omitted in illustration.

Tread Pattern

Figure 2:
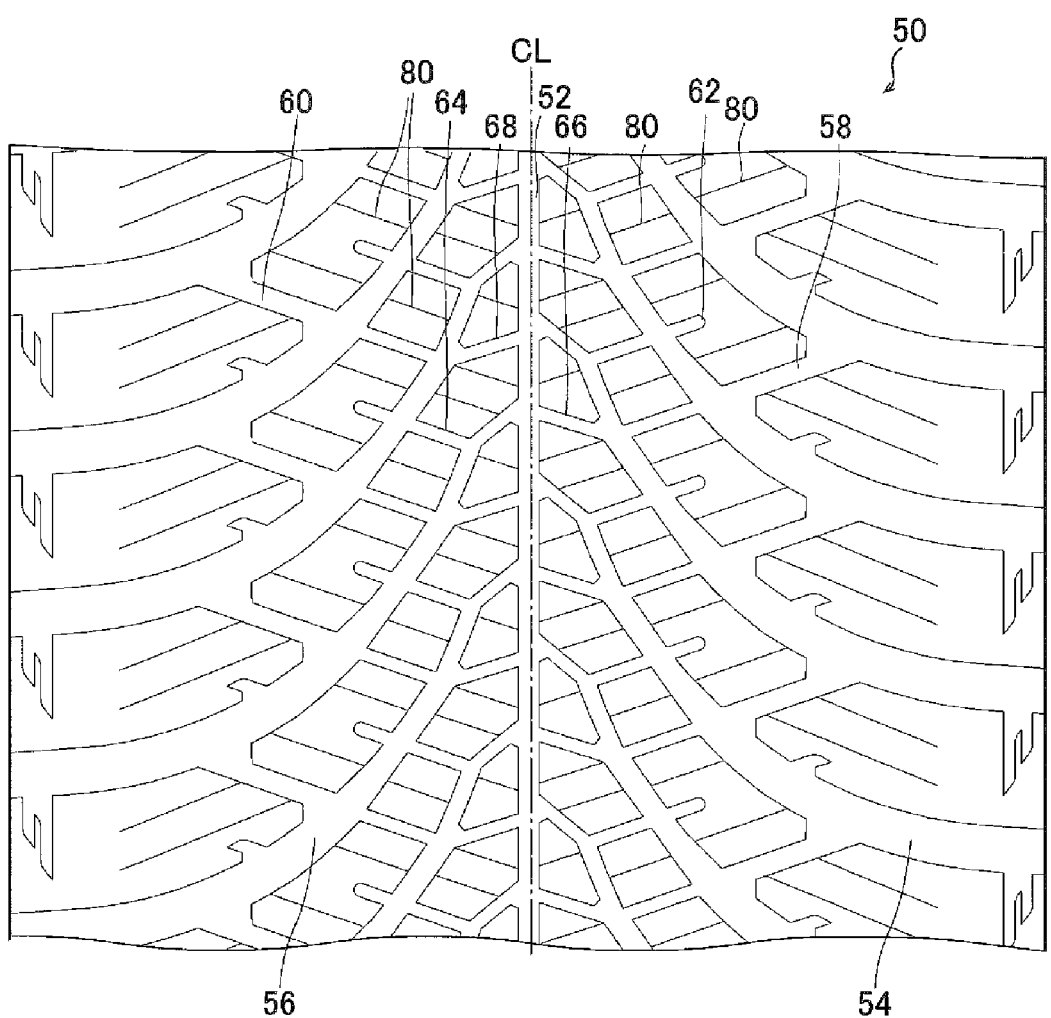
FIG. 2 is a view illustrating a tread pattern provided on a tread portion in the embodiment.

FIG. 2 is a view illustrating the tread pattern 50 provided on a tread portion in the embodiment.

The tread pattern 50 includes a circumferential main groove 52 extending on the tire equator line CL in the tire circumferential direction, and the inclined grooves 54, 56, the communicating grooves 58, 60, 62, 64, and the branch grooves 66, 68 that are provided at an interval in the tire circumferential direction.

The inclined grooves 54, 56 extend from the circumferential main groove 52 toward both sides in the tire lateral direction, are inclined with respect to the tire circumferential direction and the tire lateral direction, and extend to pattern ends on outer sides in the tire lateral direction.

The groove widths of the inclined grooves 54, 56 are increased as progressing in the tire lateral direction.

The communicating grooves 58, 60 extend outward in the tire lateral direction from the inclined grooves 54, 56 so as to intersect two inclined grooves 54, 56 adjacent in the tire circumferential direction, and end in second inclined grooves 54, 56.

The communicating grooves 62, 64 extend outward in the tire lateral direction from the inclined grooves 54, 56 so as to intersect one inclined grooves 54, 56 adjacent in the tire circumferential direction, and ends without intersecting second inclined grooves 54, 56. A side in the tire circumferential direction to which the communicating grooves 58, 60, 62, 64 progress outward in the tire lateral direction and a side in the tire circumferential direction to which the inclined grooves 54, 56 progress outward in the tire lateral direction are different from each other and opposite to each other.

The branch grooves 66, 68 extend inward in the tire lateral direction from positions at which the inclined grooves 54, 56 are joined to the communicating grooves 58, 60, and communicate with the circumferential main groove 52.

With the groove structure as described above, a plurality of blocks are formed. A plurality of sipes 80 are provided in each of the blocks.

The tread pattern 50 of the tire 10 has a structure as describe above, but the tread pattern 50 is not limited to that illustrated in FIG. 2.

Sipes

Figure 3A:
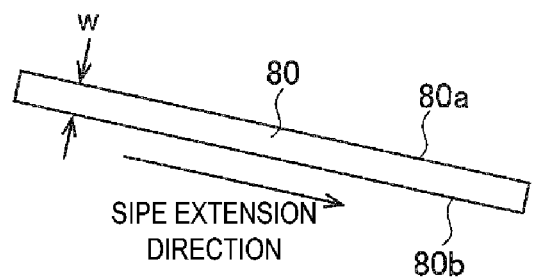
FIGS. 3A and 3B are views each illustrating a sipe in the embodiment.
Figure 3B:
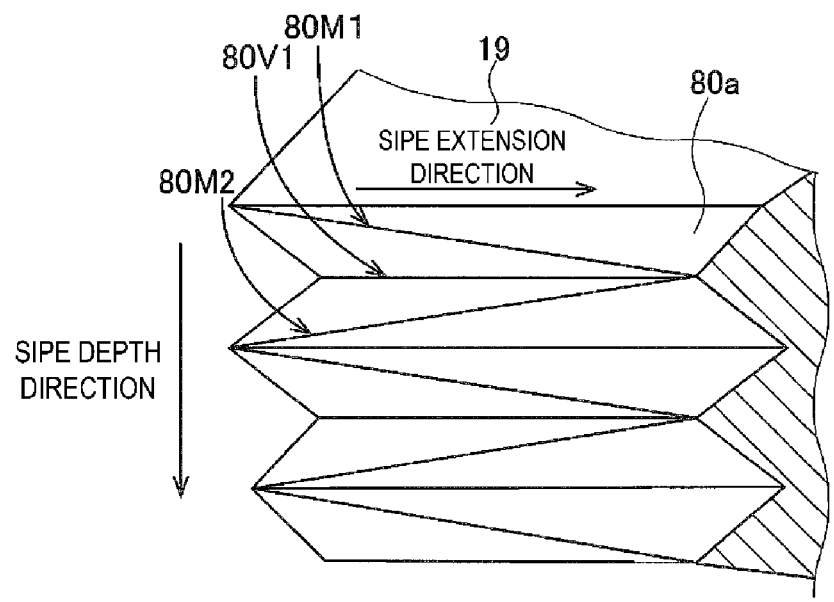

FIGS. 3A and 3B are views illustrating the sipe 80 in the embodiment. FIG. 3A illustrates an opening of the sipe 80 in the tread surface 19. In the sipe extension direction in which the sipe 80 extends in the tread surface, the opening extends linearly, and may extend in a curved shape that is smoothly curved. A width w of a sipe space sandwiched by the sipe wall surfaces 80a, 80b defining the sipe 80 in the sipe extension direction is, for example, from 0.2 mm to 1.5 mm. In a tire mold, as a mold forming the sipe 80, a plate-like sipe cutting edge is mounted on a mold tread formation surface provided with a protruding portion of the tire mold that forms a groove.

Of the pair of sipe wall surfaces 80a, 80b of the tread portion, which face the space of the sipe 80, the sipe wall surface 80a (first sipe wall surface) includes a wave-like portion at each position in the sipe extension direction. The wave-like portion is bent in a wave-like shape to form surface recesses/protrusions along a sipe depth direction, and has at least two peak portions and at least one valley portion. FIG. 3B illustrates a recess/protrusion shape of the sipe wall surface 80*a*. The sipe wall surface 80*b* is distanced away at each position along the sipe wall surface 80*a*, forming the sipe space. Therefore, the portion of the sipe wall surface 80*b* that faces the position corresponding to the protrusion of the sipe wall surface 80*a* is the recess, and the portion of the sipe wall surface 80*b* that faces the position corresponding to the recess of the sipe wall surface 80*a* is the protrusion. Therefore, the sipe wall surface 80*b* (the second sipe wall surface) includes a wave-like portion at each position in the sipe extension direction, which is bent in a wave-like shape to form the surface recesses/protrusions along the sipe depth direction and has at least two second valley portions and at least one second peak portion. At least two second valley portions are provided to face at least two first peak portions, and at least one second peak portion is provided to face at least one first valley portion. In this case, the peak portions refer to the portions being the tread rubber projecting from the sipe wall surfaces 80*a*, 80*b*, and the valley portions refer to the portions being the tread rubber recessed in the sipe wall surfaces 80*a*, 80*b* with respect to the peak portions.

More specifically, when the peak portion and the valley portion are viewed along the sipe depth direction, a recess depth of the sipe wall surface 80*a* with respect to the peak portions varies in accordance with the position in the extension direction so as to be equivalent to the maximum recess depth or smaller than the maximum recess depth of the recess depth of the valley portion. The recess depth refers to the recess depth of the valley portion from the peak portion positioned closest to the concerned valley portion. When the heights of the peak portions are different, a larger recess depth is referred. In the example illustrated in FIG. 3B, a valley portion 80V1 is present between a peak portion 80M1 and a peak portion 80M2 in the sipe depth direction. The recess depth of the valley portion 80V1 with respect to the peak portion 80M1 and the peak portion 80M2 varies along the sipe extension direction, and reduces gradually as approaching the right side in the drawing in the illustrated example.

The valley portion 80V1 is sandwiched between the two peak portions being the peak portion 80M1 and the peak portion 80M2, and extends from one end side in the sipe extension direction to the other end side in the sipe extension direction. The recess depth of the valley portion 80V1 with respect to the two peak portions 80M1 and 80M2 reduces gradually as approaching the other end side from the one end side of the sipe 80 in the sipe extension direction. At least one position of the peak portion 80M1 and the peak portion 80M2 in the sipe depth direction and a position of the valley portion 80V1 in the sipe depth direction become gradually closer from the one end side to the other end side of the sipe 80 in the sipe extension direction. In the example illustrated in FIG. 3B, both the positions of the peak portion 80M1 and the peak portion 80M2 in the sipe depth direction become gradually closer to the position of the valley portion 80V1 in the sipe depth direction. However, the position of the peak portion 80M1 in the sipe depth direction may be gradually closer to the position of the valley portion 80V1 in the sipe depth direction while the gap between the position of the peak portion 80M2 in the sipe depth direction and the position of the valley portion 80V1 in the sipe depth direction is constant or increased. Further, the position of the peak portion 80M2 in the sipe depth direction may be gradually closer to the position of the valley portion 80V1 in the sipe depth direction while the gap between the position of the peak portion 80M1 in the sipe depth direction and the position of the valley portion 80V1 in the sipe depth direction is constant or increased.

In this case, in the sipe wall surface 80*b* (second sipe wall surface), when the peak portions and the valley portions are viewed along the sipe depth direction, the projection height of the peak portion with respect to the valley portions on the sipe wall surface 80*b* preferably varies in accordance with the position in the extension direction. The peak portion of the sipe wall surface 80*b* is preferably sandwiched between the valley portions, and preferably extends from one end side of the sipe 80 in the sipe extension direction to the other end side in the sipe extension direction. Preferably, the protrusion height of the peak portion reduces gradually as approaching the other end side from the one end side of the sipe 80 in the sipe extension direction. Preferably, a position of at least one valley portion of the two valley portions in the sipe depth direction and the position of the peak portion in the sipe depth direction become gradually closer from the one end side to the other end side of the sipe 80 in the sipe extension direction.

As described above, while progressing toward one side in the sipe extension direction, the recess depth of the valley portion 80V1 reduces gradually, and at least one position of the peak portion 80M1 and the peak portion 80M2 in the sipe depth direction and the position of the valley portion 80V1 in the sipe depth direction become gradually closer. Thus, when being flexed, the sipe wall surfaces can be engaged to support each other. Further, even when one sipe wall surface of the sipe wall surfaces 80*a*, 80*b* is flexed in the sipe extension direction, the inclination surfaces of the peak portions or the valley portions of the other sipe wall surface can support the inclination surfaces of the valley portions or the peak portions of the flexed sipe wall surface. Thus, the sipe wall surfaces can be engaged to support each other. Thus, degradation of block rigidity, which is caused by providing the sipes 80 in the blocks of the tread portion, can be suppressed. Moreover, the recess depth of the valley portion 80V1 reduces gradually. Thus, demolding can be improved.

According to the embodiment, at any position of the sipe 80 in the extension direction, a projection level of a top portion of the peak portion with respect to a sipe reference plane of the sipe wall surface 80*a* is the same. In this case, at each position in the sipe extension direction, varied dimensions of the recesses/protrusions of the peak portion and the valley portion along the sipe depth direction with respect to the sipe reference plane are expressed with positive or negative values. The sipe reference plane refers to the plane formed so that an average of the values is zero. The surface is a flat surface or a curved surface. That is, when the recesses/protrusions of the peak portion and the valley portion of the sipe wall surface with respect to the sipe reference plane are expressed with positive or negative values, and an average of the heights of the recesses/protrusions is calculated, the height average is zero.

In this case, arrangement of the peak portion 80M1 and the second peak portion 80M2 along the sipe depth direction preferably varies along the sipe extension direction, and the gap between the top portion of the peak portion 80M1 (peak portion α) and the top portion of the second peak portion 80M2 (peak portion β) in the sipe depth direction is preferably increases as progressing to the left side in the extension direction in the illustrated example. In other words, the gap between the top portion of the peak portion 80M1 (peak portion α) and the top portion of the second peak portion 80M2 (peak portion β) in the sipe depth direction is preferably reduced gradually as progressing from one end side of the sipe to the other end side of the sipe in the sipe extension direction. With the shape as described above, the valley portion 80V1 can be provided between the top portion of the peak portion 80M1 and the top portion of the second peak portion 80M2 in the sipe depth direction, and the recess depth can vary. Thus, an effect that the sipe wall surfaces are engaged to support each other at the time of being flexed can be exerted more largely. Particularly, even when the sipe wall surface 80*a* and the sipe wall surface 80*b* are deformed in the sipe extension direction, and one of the sipe wall surface 80*a* and the sipe wall surface 80*b* is flexed toward the other, the gap between the top portion of the peak portion 80M1 and the top portion of the second peak portion 80M2 in the sipe depth direction varies in the sipe extension direction. Thus, the peak portion of the sipe wall surface 80*b* and the valley portion 80V1 facing the peak portion are engaged with each other so that the sipe wall surface 80*a* and the sipe wall surface 80*b* can support each other. Thus, degradation of block rigidity due to the sipes provided in the blocks can be suppressed.

According to the embodiment, a clearance between the sipe wall surface 80*a* (first sipe wall surface) and the sipe wall surface 80*b* (second sipe wall surface) is preferably constant in the sipe depth direction and the sipe extension direction because the sipe wall surfaces 80*a*, 80*b* can support each other evenly regardless of the positions.

Figure 4:
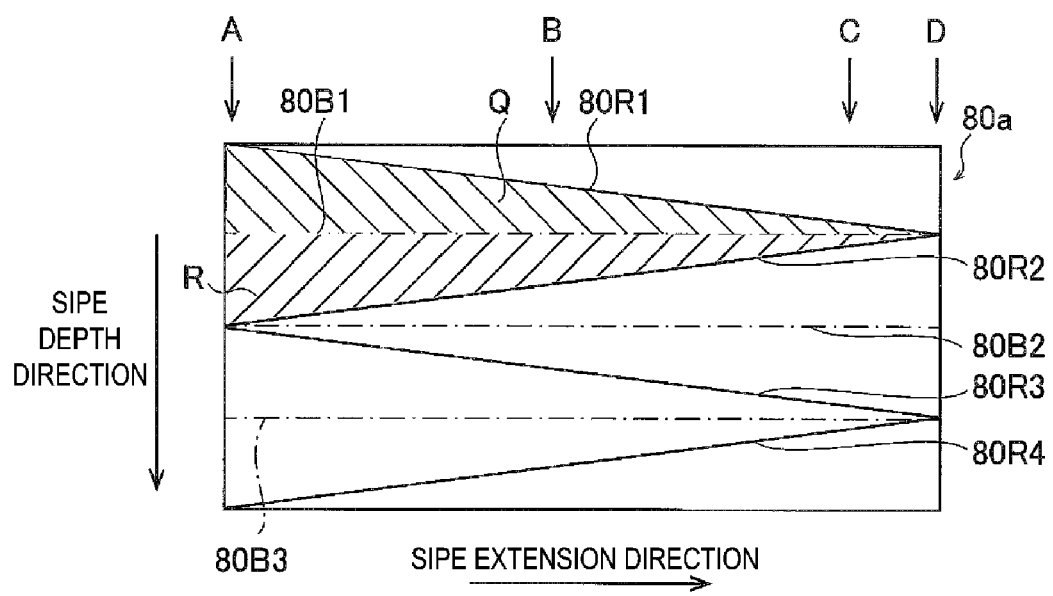
FIG. 4 is a plan view of a sipe wall surface illustrated in FIG. 3B.

FIG. 4 is a plan view of the sipe wall surface 80*a* illustrated in FIG. 3B. FIGS. 5A to 5D are views schematically illustrating examples of the shape of the sipe wall surface 80*a* taken along at a position A to a position D in the sipe extension direction in FIG. 4.

As illustrated in FIG. 4, the peak portion of the sipe wall surface 80*a* includes ridge lines 80R1, 80R2, 80R3, 80R4 being the top portion continuously extending along the sipe extension direction at the same position in the sipe extension direction. The top portion forms the protrusion with respect to a peripheral position in the sipe depth direction. Further, the valley portion of the sipe wall surface 80*a* has valley bottom lines 80B1, 80B2, and 80B3 being the valley portion continuously extending along the sipe extension direction at the same position in the sipe extension direction. The valley portion forms the recess with respect to a peripheral position in the sipe depth direction. In FIG. 4, the ridge lines 80R1, 80R2, 80R3, 80R4 are indicated with solid lines, the valley bottom lines 80B1, 80B2, and 80B3 are indicated with dot-dash lines. Note that the ridge lines described in the present specification are the lines of the top portion when the top portion of the peak portion extend linearly. However, when the top portion extends in a flat-surface shape with a width, the ridge lines may be lines obtained by connecting center positions of the flat surface in the width direction.

Here, the ridge lines 80R1, 80R2, 80R3, 80R4 are formed to have positions varying in the sipe depth direction while progressing in the sipe extension direction. The ridge lines 80R1, 80R3 have deeper positions in the sipe depth direction as progressing to the right side in FIG. 4, and the ridge lines 80R2, 80R4 have shallower positions in the sipe depth direction as progressing to the right side in FIG. 4.

Note that FIG. 4 illustrates the ridge lines and the valley bottom lines of the sipe wall surface 80*a*. On the sipe wall surface 80*b*, valley bottom lines are provided at positions facing the ridge lines 80R1, 80R2, 80R3, 80R4 of the sipe wall surface 80*a*, and ridge lines are provided at positions facing the valley bottom lines 80B1, 80B2, and 80B3 of the sipe wall surface 80*a*. Thus, on the sipe wall surface 80*b*, the valley bottom lines have positions varying in the sipe depth direction while progressing in the sipe extension direction.

As described above, the positions of the ridge lines or the valley bottom lines in the sipe depth direction vary, and arrangement of the peak portion and the valley portion varies in accordance with the positions in the sipe extension direction. With this, it is possible to obtain such shape that the sipe cutting edge is less likely to receive resistance from the tread rubber and that the sipe cutting edge comes off easily when the sipe cutting edge of the tire mold is pulled out from the tread rubber. Thus, demolding of the tire can be improved.

For the purpose of improving demolding of the tire described above, according to the embodiment, the ridge line 80R1 (ridge line A) and the ridge line 80R2 (ridge line B), the ridge line 80R2 (ridge line A) and the ridge line 80R3 (ridge line B), or the ridge line 80R3 (ridge line A) and the ridge line 80R4 (ridge line B) are preferably closer to each other as progressing to one side in the sipe extension direction. In this case, as illustrated in FIG. 4, the ridge lines getting close to each other may be joined to each other, or may not be joined to each other.

According to the embodiment, as illustrated in FIG. 4, for example, the ridge line 80R1 (ridge line A) and the ridge line 80R2 (ridge line B) are joined into one, the valley bottom line 80B1 (valley bottom line C) being one of the valley bottom lines is provided between the ridge line 80R1 and the ridge line 80R2 in the sipe depth direction, and the valley bottom line 80B1 extends to the joining position (first joining position) of the ridge line 80R1 and the ridge line 80R2. In this case, the recess depth of the valley bottom line 80B1 with respect to the ridge line 80R1 and the ridge line 80R2 is preferably reduced gradually as approaching the joining position (first joining position), and the recess depth of the valley bottom line 80B1 is preferably zero at the joining position (first joining position). With this, while improving demolding of the tire, an effect that the sipe wall surfaces are engaged to support each other at the time of being flexed can be exerted more largely.

Figures 5A, 5B, 5C, 5D:
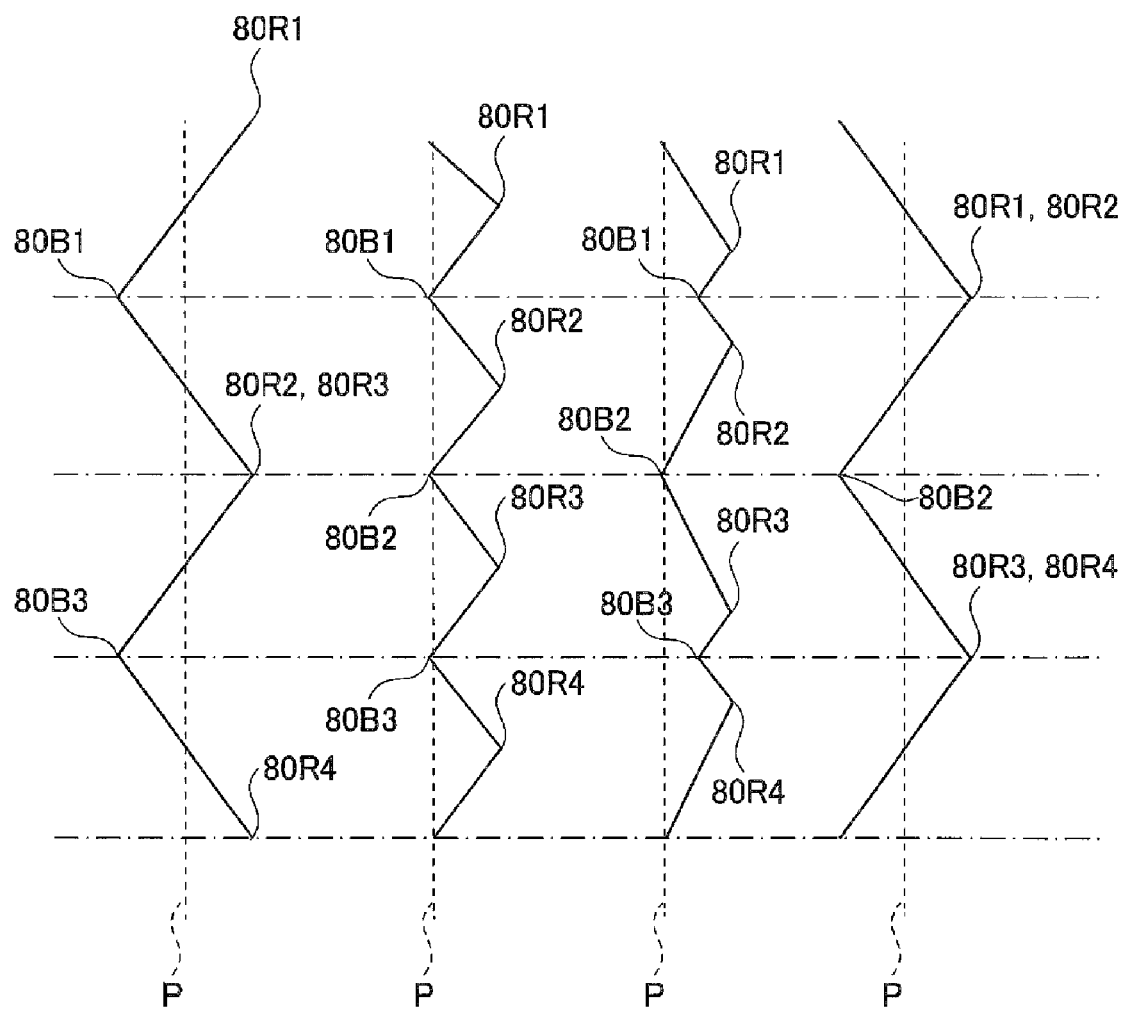
FIGS. 5A to 5D are views schematically illustrating examples of a shape of the sipe wall surface taken along at positions in a sipe extension direction in FIG. 4.

FIGS. 5A to 5D illustrate the recess/protrusion shape at the position A to the position D illustrated in FIG. 4. Variation is made in accordance with the position in the sipe extension direction with respect to a sipe reference plane P. Resistance received by the sipe cutting edge the sipe cutting edge when the sipe cutting edge is pulled out from the tread rubber varies in accordance with a variation amount of the recess/protrusion shape in the sipe depth direction, and varies less when the variation amount is smaller. The recess depth of the valley bottom lines 80B1, 80B2, and 80B3 reduces gradually from the maximum recess depth, and hence the variation amount of the recess/protrusion shape at the positions B, C is smaller than the variation amount of the surface recess/protrusion shape at the positions A, D. Thus, resistance received by the sipe cutting edge at the positions B, C is small, and hence demolding of the tire can be improved. Meanwhile, as illustrated in FIGS. 5B and 5C, the number of recesses/protrusions of the recess/protrusion shape along the sipe depth direction at the positions B, C, is more than that at the positions A, D. Thus, an effect that the sipe wall surfaces are engaged to support each other at the time of being flexed is exerted largely.

As illustrated in FIG. 4, the ridge line 80R3 (ridge line D) is provided parallel to the ridge line 80R1 at a position deeper than the ridge line 80R1 (ridge line A) in the sipe depth direction, and the ridge line 80R3 joins the ridge line 80R2 (ridge line B). The joining position of the ridge line 80R3 and the ridge line 80R2 (second joining position) is different from the joining position of the ridge line 80R1 and the ridge line 80R2 (first joining position). In the example illustrated in FIG. 4, the joining position of the ridge line 80R3 and the ridge line 80R2 (second joining position) and the joining position of the ridge line 80R1 and the ridge line 80R2 (first joining position) are the positions with the deepest valley portion with the maximum recess depth in the sipe extension direction, and are the two positions at the ends of the ridge line 80R2, which are on opposite sides to each other. With the shape as described above, the ridge lines can be provided repeatedly in the sipe depth direction. Thus, an effect that the sipe wall surfaces are engaged to support each other at the time of being flexed can be exerted largely.

As illustrated in FIG. 4, the valley bottom line 80B2 (valley bottom line E) is provided parallel to the valley bottom line 80B1 at a position deeper than the valley bottom line 80B1 (valley bottom line C) in the sipe depth direction, the valley bottom line 80B2 joins the joining position of the ridge line 80R2 and the ridge line 80R3 (second joining position), the joining position (second joining position) of the valley bottom line 80B2 at which the ridge line 80R2 and the ridge line 80R3 are joined is different from the joining position (first joining position) at which the valley bottom line 80B1, and the ridge line 80R1 and the ridge line 80R2 are joined. In the example illustrated in FIG. 4, the joining position (second joining position) of the valley bottom line 80B2 at which the ridge line 80R2 and the ridge line 80R3 are joined and the joining position (first joining position) at which the valley bottom line 80B1, and the ridge line 80R1 and the ridge line 80R2 are joined are the positions with the deepest valley portion in the sipe extension direction, and are the two positions of the ridge line 80R2, which are on opposite sides to each other. With the shape as described above, the valley bottom lines can be provided repeatedly in the sipe depth direction. Thus, an effect that the sipe wall surfaces are engaged to support each other at the time of being flexed can be exerted largely.

As illustrated in FIG. 4, the valley bottom line 80B1 (valley bottom line C) is parallel with the tread surface 19. In this case, a surface Q sandwiched between the valley bottom line 80B1 and the ridge line 80R1 (see FIG. 4) and a surface R sandwiched between the valley bottom line 80B1 and the ridge line 80R2 (see FIG. 4) face the inclined surfaces of the peak portion and the valley portion of the sipe wall surface 80b. In this case, the surfaces R and Q can be supported in the sipe extension direction when being flexed toward the surface facing the sipe wall surface 80b due to deformation. That is, even when the sipe wall surfaces 80a, 80b are deformed by being flexed in the sipe extension direction, the sipe wall surfaces can be engaged to support each other at the time of being flexed.

Further, according to the embodiment, as illustrated in FIG. 4, the position of the deepest valley portion of the valley bottom line 80B2 (valley bottom line E) with the maximum recess depth in the sipe extension direction and the position of the joining position of the ridge line 80R1 (ridge line A) and the ridge line 80R2 (ridge line B) (first joining position) in the sipe extension direction are preferably the same. With this, even when the ridge line 80R1 (ridge line A) and the ridge line 80R2 (ridge line B) are joined, and the valley bottom line 80B1 disappears, the deepest valley portion of the valley bottom line 80B2 (valley bottom line E) is present at the same position in the sipe extension direction. Thus, engagement between the sipe wall surfaces 80a, 80b is improved.

Further, the position of the deepest valley portion of the valley bottom line 80B1 (valley bottom line C) with the maximum recess depth in the sipe extension direction and the position of the joining position of the ridge line 80R2 (ridge line B) and the ridge line 80R3 (ridge line D) (second joining position) in the sipe extension direction are preferably the same. With this, even when this, the ridge line 80R2 (ridge line B) and the ridge line 80R3 (ridge line D) are joined, and the valley bottom line 80B2 (valley bottom line E) disappears, the deepest valley portion of the valley bottom line 80B1 (valley bottom line C) is present at the same position in the sipe extension direction. Thus, engagement between the sipe wall surfaces 80a, 80b is improved.

Further, according to the embodiment, as illustrated in FIG. 4, a direction in which the recess depth of the valley bottom line 80B1 (valley bottom line C) is reduced and a direction in which the recess depth of the valley bottom line 80B2 (valley bottom line E) is reduced are preferably directions opposite to each other. With this, even when one of the sipe wall surfaces 80a, 80b is deformed in any of the two directions in the sipe extension direction, the sipe wall surfaces 80a, 80b are engaged with each other. Thus, the sipe wall surfaces 80a, 80b can support each other.

In the shape illustrated in FIG. 3B, the ridge lines on the sipe wall surfaces are joined to each other. However, the ridge lines are not necessarily required to be joined to each other, and may end under a state in which the ridge lines are close to each other at the end of the sipe 80.

Note that the dimensions such as the maximum recess depth, and the inclination angles of the ridge lines and the lengths of the ridge lines that are illustrated in FIG. 4 may be set as appropriate in accordance with a target degree of demolding improvement and a degree of suppression of degradation of rigidity of the blocks or the ribs due to the provided sipes. For example, the maximum recess depth falls within a range of from 0.1 mm to 5 mm, preferably, from 0.3 mm to 2 mm. Further, the length from the position A of the maximum recess depth of the valley bottom line 80B1 to the position D at which the ridge lines 80R1, 80R2 are joined, which are illustrated in FIG. 4, falls within a range of from 0.5 mm to 8 mm, preferably, from 1 mm to 4 mm.

Examples, Conventional Example

In order to study an effect exerted by the sipe 80 according to the present embodiment, various sipes were formed in pneumatic tires illustrated in FIG. 1 and FIG. 2, and evaluation on demolding and evaluation on tire performance were conducted.

As evaluation on demolding, for each of five hundred pneumatic tires that were produced, a reciprocal of an incidence of a defect such as generation of a crack and rubber chipping in a periphery of a sipe due to a demolding defect directly after vulcanization was calculated. Then, an index of a reciprocal of the incidence of the defect in each Example was obtained, using the reciprocal of the incidence of the defect in Conventional Example 1 as a reference (index value of 100). Therefore, larger indexes indicate lower frequency of causing a defect.

As evaluation on tire performance, steering performance on dry road surfaces, which was influenced by a magnitude of block rigidity degraded by providing sipes in blocks, was studied. Sensory evaluation was performed on steering performance by a driver by performing breaking or accelerating operations and cornering turn while traveling at a predetermined speed on dry road surfaces set in advance.

Each of the pneumatic tires (tire size: 195/65R15 91H) was mounted to a rim of 15*6 J (Front wheel air pressure: 200 kPa, Rear wheel air pressure: 220 kPa) and mounted to a front wheel drive vehicle with an engine displacement of 1,500 cc. In this manner, a test vehicle was prepared. The evaluation results were given as index values with the evaluation result of Conventional Example 1 being the index value of 100. Larger index values indicate superior steering performance.

Table 1 below indicates specifications of Comparative Examples and Examples.

Note that, in each of Conventional Examples 1 and 2 and Example 2, both the maximum projection level and the maximum recess level of the peak portion with respect to a tire reference plane were set to 1 mm. In Example 1, the maximum projection height with respect to the tire reference plane was set to 0.5 mm.

In Examples 1 and 2, the distance of the valley bottom line 80B1 in the maximum recess depth, which is illustrated in FIG. 4, from the position A to the position D at which the ridge line 80R1 and the ridge line 80R2 were joined was set to 8 mm.

"※1" in "Sipe shape" in Conventional Example 1 indicates that the wave-like shape along the sipe depth direction was in phase at all the positions in the sipe extension direction.

"※2" in "Sipe shape" in Conventional Example 2 indicates that, while the wave-like shape along the sipe depth direction maintained in-phase in the sipe extension direction, the width of the wave-like shape was gradually reduced from the maximum width from one end in the sipe extension direction to the center in the sipe extension direction, became 0 at the center, and, as approaching the other end after passing through the center, was increased to have the phase of the wave-like shape reverse to the phase the wave-like shape between the one end and the center and have the maximum width at the other end. That is, the sipe of Conventional Example 2 had the shape of the sipe described in JP 2011-105131 A.

TABLE 1

|  | Conventional Example 1 | Conventional Example 2 | Example 1 | Example 2 |
| --- | --- | --- | --- | --- |
| Sipe form | ※1 | ※2 | FIG. 3B | FIG. 3B |
| Maximum projection level, Maximum recess level (mm) | 1 | 1 | 0.5 | 1 |
| Demolding | 100 | 102 | 104 | 103 |
| Steering performance | 100 | 99 | 102 | 103 |

In comparison between Examples 1 and 2 and Conventional Examples 1 and 2, it was understood that the sipe 80 according to the present embodiment was given high evaluation on both demolding and steering performance. Particularly, in Example 1, evaluation on both demolding and steering performance was high even when the maximum projection level and the maximum recess level in a wave-like shape were smaller than those in Conventional Examples 1 and 2. With this, it can be concluded that the sipe 80 is capable of suppressing degradation of block rigidity due to the sipes provided in the blocks while improving demolding of the tire.

The foregoing has been a detailed description of the pneumatic tire according to the present technology. However, the present technology is naturally not limited to the embodiments and Examples, and may be improved or modified in various ways within the scope of the present technology.

The invention claimed is:

1. A pneumatic tire provided with a sipe in a tread portion, the pneumatic tire comprising, in the tread portion:
   a first sipe wall surface of a pair of sipe wall surfaces that face a space of the sipe, the first sipe wall surface comprising a first wave-like portion at each position in an extension direction of the sipe in which the sipe extends on a tread surface, the first wave-like portion being bent in a wave-like shape to form surface recesses/protrusions along a sipe depth direction and comprising at least two first peak portions and at least one first valley portion; and
   a second sipe wall surface of the pair of sipe wall surfaces that comprises a second wave-like portion at each position in the extension direction of the sipe, the second wave-like portion being bent in a wave-like shape to form surface recesses/protrusions along the sipe depth direction and comprising at least two valley portions that are provided facing the at least two first peak portions and at least one second peak portion that is provided facing the at least one first valley portion,
   the first valley portion being sandwiched between two adjacent first peak portions that are adjacent in the sipe depth direction out of the at least two first peak portions in the sipe depth direction and extending from one end side of the sipe in the extension direction to an other end side of the sipe in the extension direction,
   a recess depth of the first valley portion with respect to the two adjacent first peak portions gradually reducing as progressing from the one end side to the other end side, and
   an each position of the two adjacent first peak portions in the sipe depth direction and a position of the first valley portion in the sipe depth direction being gradually closer to each other as progressing from the one end side to the other end side, wherein
   the first valley portion comprises a valley bottom line, the valley bottom line being a bottom portion of the first valley portion continuously extending in the extension direction, and
   the valley bottom line is parallel to the tread surface.

2. The pneumatic tire according to claim 1, wherein
   a projection level of a top portion of each of the first peak portions with respect to a sipe reference plane of the sipe is constant at any position in the extension direction,
   the sipe reference plane being a plane formed so that an average of values is zero, when a value is defined as variable dimension of the surface recesses/protrusions of the first peak portions and the first valley portion along the sipe depth direction with respect to the sipe reference plane with positive or negative value, at each position in the extension direction,
   arrangements of the first peak portions along the sipe depth direction vary along the extension direction,
   the two adjacent first peak portions comprise a peak portion α and a peak portion β, and
   a gap between a top portion of the peak portion a and a top portion of the peak portion β in the sipe depth direction gradually reduces as progressing from the one end side of the sipe in the extension direction to the other end side of the sipe in the extension direction.

3. The pneumatic tire according to claim 2, wherein
the first peak portions comprise a plurality of ridge lines, each ridge line being a top portion of one of the first peak portions continuously extending in the extension direction,
and
the plurality of ridge lines each has a position varying in the sipe depth direction while progressing in the extension direction.

4. The pneumatic tire according to claim 3, wherein a ridge line A being one of the plurality of ridge lines and a ridge line B being another one of the plurality of ridge lines of the first peak portions become closer in the sipe depth direction as progressing to one of both end sides of the sipe in the extension direction.

5. The pneumatic tire according to claim 4, wherein
the ridge line A and the ridge line B are joined to each other,
a valley bottom line C being the valley bottom line is provided between the ridge line A and the ridge line B in the sipe depth direction,
the valley bottom line C extends to a first joining position of the ridge line A and the ridge line B, and
the recess depth of the valley bottom line C reduces gradually as approaching the first joining position, and the recess depth of the valley bottom line C becomes zero at the first joining position.

6. The pneumatic tire according to claim 5, wherein
a ridge line D of the plurality of ridge lines in the first peak portions and different from the ridge line B is provided parallel to the ridge line A at a position deeper than the ridge line A in the sipe depth direction, and
the ridge line D joins the ridge line B, and a second joining position of the ridge line D and the ridge line B is different from the first joining position.

7. The pneumatic tire according to claim 6, wherein
the at least one first valley portion comprises a plurality of first valley portions,
a valley bottom line E of the plurality of first valley portions is provided parallel to the valley bottom line C at a position deeper than the valley bottom line C in the sipe depth direction, and
the valley bottom line E joins the ridge line B and the ridge line D at the second joining position.

8. The pneumatic tire according to claim 7, wherein a position of a deepest valley portion of the valley bottom line E with a maximum recess depth in the extension direction and a position of the first joining position in the extension direction are identical each other.

9. The pneumatic tire according to claim 8, wherein a direction in which the recess depth of the valley bottom line C reduces and a direction in which the recess depth of the valley bottom line E reduces are opposite to each other.

10. The pneumatic tire according to claim 9, wherein a position of a deepest valley portion of the valley bottom line C with a maximum recess depth in the extension direction and a position of the second joining position in the extension direction are identical each other.

11. The pneumatic tire according to claim 1, wherein
the first peak portions comprise a plurality of ridge lines, each ridge line being a top portion of one of the first peak portions continuously extending in the extension direction,
and
the plurality of ridge lines each has a position varying in the sipe depth direction while progressing in the extension direction.

12. The pneumatic tire according to claim 11, wherein a ridge line A being one of the plurality of ridge lines and a ridge line B being another one of the plurality of ridge lines of the first peak portions become closer in the sipe depth direction as progressing to one of both end sides of the sipe in the extension direction.

13. The pneumatic tire according to claim 12, wherein
the ridge line A and the ridge line B are joined to each other,
a valley bottom line C being the valley bottom line is provided between the ridge line A and the ridge line B in the sipe depth direction,
the valley bottom line C extends to a first joining position of the ridge line A and the ridge line B, and
the recess depth of the valley bottom line C reduces gradually as approaching the first joining position, and the recess depth of the valley bottom line C becomes zero at the first joining position.

14. The pneumatic tire according to claim 13, wherein
a ridge line D of the plurality of ridge lines in the first peak portions and different from the ridge line B is provided parallel to the ridge line A at a position deeper than the ridge line A in the sipe depth direction, and
the ridge line D joins the ridge line B, and a second joining position of the ridge line D and the ridge line B is different from the first joining position.

15. The pneumatic tire according to claim 14, wherein
the at least one first valley portion comprises a plurality of first valley portions,
a valley bottom line E of the plurality of first valley portions is provided parallel to the valley bottom line C at a position deeper than the valley bottom line C in the sipe depth direction, and
the valley bottom line E joins the ridge line B and the ridge line D at the second joining position.

16. The pneumatic tire according to claim 15, wherein a position of a deepest valley portion of the valley bottom line E with a maximum recess depth in the extension direction and a position of the first joining position in the extension direction are identical each other.

17. The pneumatic tire according to claim 15, wherein a direction in which the recess depth of the valley bottom line C reduces and a direction in which the recess depth of the valley bottom line E reduces are opposite to each other.

18. The pneumatic tire according to claim 14, wherein a position of a deepest valley portion of the valley bottom line C with a maximum recess depth in the extension direction and a position of the second joining position in the extension direction are identical each other.

\* \* \* \* \*